(12) United States Patent
Achenbach et al.

(10) Patent No.: US 7,722,957 B2
(45) Date of Patent: May 25, 2010

(54) SILICONE RUBBER COMPOSITIONS AND LONG-TERM-STRESS-RESISTANT SILICONE ELASTOMERS OBTAINED THEREFROM

(75) Inventors: Frank Achenbach, Simbach am Inn (DE); Armin Fehn, Mehring (DE)

(73) Assignee: Wacker Chemie AG, Munich (DE)

( * ) Notice: Subject to any disclaimer, the term of this patent is extended or adjusted under 35 U.S.C. 154(b) by 781 days.

(21) Appl. No.: 11/352,747

(22) Filed: Feb. 13, 2006

(65) Prior Publication Data

US 2006/0188733 A1 Aug. 24, 2006

(30) Foreign Application Priority Data

Feb. 24, 2005 (DE) .................. 10 2005 008 951

(51) Int. Cl.
B32B 25/00 (2006.01)
B32B 9/04 (2006.01)
C08L 83/04 (2006.01)

(52) U.S. Cl. .................. 428/447; 524/588; 524/860; 524/866

(58) Field of Classification Search .............. 524/588
See application file for complete search history.

(56) References Cited

U.S. PATENT DOCUMENTS

| | | | | |
|---|---|---|---|---|
| 3,498,945 A * | 3/1970 | Lefort et al. | .................. | 524/588 |
| 3,544,513 A * | 12/1970 | Lefort et al. | .................. | 525/474 |
| 3,652,475 A * | 3/1972 | Wada | .................. | 524/266 |
| 3,844,992 A * | 10/1974 | Antonen | .................. | 524/862 |
| 3,974,122 A * | 8/1976 | Sato et al. | .................. | 524/500 |
| 4,020,044 A | 4/1977 | Crossan et al. | | |
| 4,268,452 A * | 5/1981 | Mine et al. | .................. | 524/860 |
| 4,339,564 A * | 7/1982 | Okamura | .................. | 528/15 |
| 4,347,336 A * | 8/1982 | Homan et al. | .................. | 524/731 |
| 4,444,940 A * | 4/1984 | Polmanteer | .................. | 524/500 |
| 4,614,760 A * | 9/1986 | Homan et al. | .................. | 524/860 |
| 4,728,687 A * | 3/1988 | Watanabe et al. | .................. | 524/493 |
| 4,745,144 A | 5/1988 | Itoh et al. | | |
| 4,766,170 A * | 8/1988 | Honma et al. | .................. | 524/500 |
| 5,015,691 A * | 5/1991 | Lewis et al. | .................. | 525/100 |
| 5,082,596 A * | 1/1992 | Fukuda et al. | .................. | 252/511 |
| 5,118,754 A * | 6/1992 | Miyakoshi et al. | .................. | 524/731 |
| 5,171,773 A * | 12/1992 | Chaffee et al. | .................. | 524/493 |
| 5,194,479 A * | 3/1993 | Takahashi et al. | .................. | 524/401 |
| 5,206,329 A * | 4/1993 | Sumpter et al. | .................. | 528/15 |
| 5,516,832 A * | 5/1996 | Kennan et al. | .................. | 524/493 |
| 5,521,245 A | 5/1996 | Hirabayashi et al. | | |
| 5,569,688 A * | 10/1996 | Meguriya et al. | .................. | 524/188 |
| 5,623,028 A * | 4/1997 | Fitzgerald et al. | .................. | 525/474 |
| 5,661,210 A * | 8/1997 | Burns et al. | .................. | 524/493 |
| 5,705,588 A * | 1/1998 | Kreis et al. | .................. | 528/24 |
| 6,051,672 A * | 4/2000 | Burns et al. | .................. | 528/10 |
| 6,054,518 A * | 4/2000 | Hayashida | .................. | 524/310 |
| 6,121,368 A * | 9/2000 | Heying et al. | .................. | 524/493 |
| 6,245,875 B1 * | 6/2001 | Wang | .................. | 528/25 |
| 6,251,990 B1 * | 6/2001 | Meguriya et al. | .................. | 524/862 |
| 6,268,426 B1 * | 7/2001 | Hirabayashi et al. | .................. | 524/495 |
| 6,339,124 B1 * | 1/2002 | Igarashi et al. | .................. | 524/588 |
| 6,387,518 B1 * | 5/2002 | Wolfer et al. | .................. | 428/447 |
| 6,407,159 B2 * | 6/2002 | Sugimoto et al. | .................. | 524/729 |
| 6,514,428 B2 * | 2/2003 | Suzuki et al. | .................. | 252/74 |
| 6,645,638 B2 * | 11/2003 | Fujiki et al. | .................. | 428/447 |
| 6,777,031 B2 * | 8/2004 | Rocks | .................. | 427/387 |
| 6,967,221 B2 * | 11/2005 | Meguriya | .................. | 521/54 |
| 2001/0011117 A1 * | 8/2001 | Pesch et al. | .................. | 525/103 |
| 2001/0016609 A1 * | 8/2001 | Meguriya et al. | .................. | 521/54 |
| 2005/0165161 A1 * | 7/2005 | Igarashi et al. | .................. | 524/865 |
| 2006/0142453 A1 * | 6/2006 | Jerschow et al. | .................. | 524/403 |
| 2007/0066783 A1 * | 3/2007 | Woerner et al. | .................. | 528/15 |

FOREIGN PATENT DOCUMENTS

| | | |
|---|---|---|
| DE | 30 12 777 A1 | 1/1981 |
| EP | 0 305 073 A2 | 3/1989 |
| EP | 0 497 277 A2 | 8/1992 |
| EP | 0 501 380 A2 | 9/1992 |
| EP | 0 542 471 A1 | 5/1993 |
| EP | 0 798 342 A2 | 10/1997 |
| EP | 0 841 363 A1 | 5/1998 |
| EP | 0 919 594 B1 | 7/2001 |
| JP | 02289649 A | 11/1990 |
| JP | 04159370 A | 6/1992 |
| JP | 7-196803 | 8/1995 |
| JP | 09302230 A | 11/1997 |

OTHER PUBLICATIONS

English Derwent Abstract AN 1980-76323C [43] Corresponding to DE 30 12 777 A1.
English Derwent Abstract AN 1999-304807 [26] Corresponding to EP 0 919 594 B1.
Lake et al., "The Strength of highly elastic materials", Proc. R. Soc. London Ser. A, A300, pp. 108-119 (1967).
Ziemelis et al., "Sequence Distribution in Poly(dimethylsiloxane-co-methylvinylsiloxanes", Macromolecules 1989, 22, pp. 2111-2116.

* cited by examiner

*Primary Examiner*—Randy Gulakowski
*Assistant Examiner*—Robert Loewe
(74) *Attorney, Agent, or Firm*—Brooks Kushman P.C.

(57) ABSTRACT

The present invention relates to silicone rubber compositions and long-term-stress-resistant silicone elastomers obtained therefrom, which have excellent resistance to long-term dynamic mechanical stresses, and to their use.

15 Claims, No Drawings

SILICONE RUBBER COMPOSITIONS AND LONG-TERM-STRESS-RESISTANT SILICONE ELASTOMERS OBTAINED THEREFROM

BACKGROUND OF THE INVENTION

1. Field of the Invention

The present invention relates to silicone rubber compositions and to long-term-stress-resistant silicone elastomers obtained therefrom which exhibit excellent resistance to long-term dynamic mechanical stresses, and to their use.

2. Background Art

Silicone elastomers are frequently used in applications which are associated with high dynamic mechanical stresses. Examples are oscillation dampers, resonance dampers, exhaust and catalyst suspension elements, and engine mounts in automobiles. Further examples include mountings for movable parts in machine construction, peristaltic pump tubing in the medical field, diaphragms, valves, and in particular, keypads commonly used in the electronics field. To maintain the function of these silicone elastomer components, it is particularly important that the mechanoelastic properties either exhibit no change or change only slightly when dynamic mechanical stress is applied repetitively. However, repeated dynamic mechanical stress cycles generally lead unavoidably to continually increasing mechanical fatigue and damage to all elastomer materials, and this ultimately leads to a loss of function of the elastomer component. The keypads made of conventional silicone elastomers can, for example, withstand several million deformation cycles until their function is lost completely.

To meet the increased requirements in terms of the service time of elastomer components subjected to dynamic mechanical stress, numerous methods of increasing the resistance to dynamic mechanical stress, known as long-term stress resistance or fatigue resistance, durability or flex life, have been developed.

U.S. Pat. No. 4,745,144 describes silicone compositions to which particular organophosphorus compounds have been added for the purpose of increasing the long-term stress resistance, as a result of which a long-term stress resistance determined by the de Mattia test in accordance with JIS K-6301 of, for example, about 7 million deformation cycles can be achieved. However, the presence of organophosphorus compounds in silicone compositions or silicone elastomers has a number of disadvantages. For example, platinum-catalyzed addition crosslinking is inhibited, compression set is higher, thermal stability is reduced, and undesirable, and at times, toxic decomposition products are formed upon heating.

EP 0 841 363 A1 discloses a method for preparing silicone rubber compositions continuously. Due to the use of specific siloxanols which promote wetting of the filler, they addition crosslink to form silicone elastomers having an increased long-term stress resistance. The long-term stress resistances determined in accordance with JIS K-6301 by the de Mattia test reach values of up to 14 million deformation cycles. However, a disadvantage is that the preparation of the required siloxanols, which proceeds via a palladium-catalyzed hydrolysis step, is relatively complicated. In addition, stabilizing additives are necessary for storage of such siloxanols and the silanol groups which have not reacted in the silicone composition can lead to a viscosity increase during storage, known as "crepe hardening".

EP 0 501 380 A2 discloses that the mechanical long-term stress resistance of silicone elastomers can be considerably improved by addition of a siloxane which has a carbinol group bound via a divalent hydrocarbon radical to Si. Long-term stress resistances of, for example, about 4 million stress cycles were able to be achieved in the de Mattia test, in accordance with JIS K-6301, by this method. A disadvantage is the relatively complicated preparation of carbinol-functional siloxanes. In addition, such compounds have a thixotropic effect, i.e. the flowability of the silicone composition is considerably impaired. Furthermore, the relatively long-chain alkylene spacers in the carbinol-functional siloxane also lead to a reduction in the thermal stability.

EP 0 497 277 A2 describes crosslinkable silicone compositions which contain an additional constituent in order to increase the resistance of silicone elastomers to repetitive deformation. The additional constituent is an organooligosiloxane which has from 2 to 10 Si atoms per molecule, at least one Si-bonded alkenyl group, and at the same time, at least two Si-bonded hydrolyzable groups. In this way, long-term stress resistances of about 4 million stress cycles are achieved in the de Mattia test. However, additives having hydrolyzable groups can cause a massive increase in viscosity in flowable silicone compositions, which is why this method is only suitable for solid silicone rubber compositions.

All approaches according to the prior art for increasing long-term stress resistance are based on addition of specific additives. However, this results in many disadvantages in terms of the performance of the silicone elastomers, for example reduced thermal stability and an increase in viscosity. In addition, the long-term stress resistances obtainable by means of these methods no longer meet increased requirements with respect to the service time of silicone elastomer components subjected to dynamic mechanical stress.

One starting point for a solution is based on the fact that low filler content and high filler dispersibility have an advantageous effect on long-term stress resistance. Furthermore, service time of elastomer components subjected to dynamic mechanical stress increases with increasing mechanical strength, for example tear propagation resistance or ultimate tensile strength of the elastomer. As described in G. J. Lake, A. G. Thomas, PROC. R. SOC. LONDON SER. A, A300, 108-119 (1967), the energy required for propagation of a crack is proportional to the square root of the mean molecular weight of the polymer chain located between two nodes of the network. Thus, the long-term stress resistance of, inter alia, a silicone elastomer should be able to be increased by setting a low crosslink density and thus a relatively low modulus. In agreement with this, DE 30 12 777 A1 discloses that the flex life of a peristaltic pump can be increased by selection of a silicone elastomer having a relatively low modulus.

EP 0 798 342 A2 describes addition-crosslinkable silicone rubber compositions which can be used to produce keypads which display improved hysteresis behavior, i.e. the actuated keypad returns to its original position more quickly and more completely. Associated therewith is a more pronounced response of the keypad which the user of the keypad perceives as stronger snapping-back and as a cracking which confirms depression, referred to as crispness. The improved hysteresis behavior is achieved by a combination of a polysiloxane having vinyl functionality exclusively at the ends of the chain, i.e. an α,ω-vinyl-functional polysiloxane, with a polysiloxane which additionally contains from 1 to 5 mol % of vinyl groups in the chain, and a reinforcing silica which has been treated with a mixture of tetramethyldivinyldisilazane and hexamethyldisilazane. Direct comparison with the approaches described above is not possible, since no information about the long-term stress resistance is given. With regard to the material composition, similar silicone rubber compositions are described in EP 0 305 073 A2. Here too, improved values for the ultimate tensile strength and tear propagation resistance are achieved by means of a combination of a polysiloxane having vinyl functions only at the ends of the chain with a polysiloxane which additionally has from 1 to 5 mol % of vinyl groups in the chain.

The hysteresis behavior described in the patent application EP 0 798 342 A2 relates to the mechanical recovery behavior of the elastomer, i.e. to the percentage decrease in the height of the specimen observed immediately after actuation, i.e. pressing down and letting go, of a keypad-like specimen. The mechanically incomplete or delayed recovery to the initial state indicates viscous, dissipative processes. Quite generally, all viscoelastic materials display a more or less pronounced hysteresis behavior on going through dynamic mechanical stress cycles, i.e. the stress-strain curve of a deformation cycle encloses an area which corresponds to the deformation energy dissipated per unit volume during the deformation cycle, known as the specific energy loss. The specific energy loss is consequently a characteristic measure of the internal friction occurring in a material when it is subjected to dynamic-mechanical stress.

In view of the above-described prior art, it is to be expected that low-modulus silicone elastomers having a low specific energy loss will have the highest long-term stress resistances. However, a direct comparison of the second approach with the first approach cannot be made, since no determination of the long-term stress resistance by means of the de Mattia test in accordance with JIS K-6301 was carried out.

SUMMARY OF THE INVENTION

It is therefore an object of the present invention to provide crosslinkable silicone compositions with basic constituents in such a way that, without addition of additives, the silicone elastomers obtained therefrom achieve far higher long-term stress resistances than conventional silicone elastomers.

DETAILED DESCRIPTION OF THE PREFERRED EMBODIMENT(S)

These and other objects have been achieved by the crosslinkable silicone rubber compositions of the invention. The crosslinkable silicone rubber compositions comprise
(A) 100 parts by weight of at least one polydiorganosiloxane comprising organosiloxy units having Si—C-bonded, aliphatically unsaturated groups, the polydiorganosiloxane (A) having
  (a) a mean degree of polymerization of from 3000 to 10,000,
  (b) from 0.2 to 20 mol % of organosiloxy units comprising aliphatically unsaturated groups, and
  (c) a low-segregation distribution of the organosiloxy units comprising aliphatically unsaturated groups, with the proviso that the block number R is $\geq 180 \cdot X_a \cdot (1-X_a)$, where $X_a$ is the mole fraction of these organosiloxy units,
(B) 1-90 parts by weight of at least one reinforcing filler which is present as a finely divided, inorganic solid having a specific surface area of at least 30 m$^2$/g,
(C) 0.1-20 parts by weight of at least one crosslinker,
(D) 0-10 parts by weight of a polydiorganosiloxane which is terminated by vinyldiorganosiloxy groups at both ends and whose units within the chain are free of aliphatically unsaturated groups and which has a mean degree of polymerization of from 3000 to 10,000,
(E) 0-200 parts by weight of further constituents selected from the group consisting of nonreinforcing fillers, talc, quartz flour, inhibitors, catalysts, plasticizers, pigments, stabilizers, flame-retardant additives, bonding agents, mold release agents, hollow microspheres and mixtures thereof, The silicone rubber compositions of the invention thus comprise polydiorganosiloxanes (A) having a very high content of vinyl groups within the chain, without addition of special additives or the use of polyorganosiloxanes which differ significantly in terms of the vinyl content or the chain length. The increase in the long-term stress resistance has therefore been achieved, contrary to the expectations based on the prior art, by a high density combined with a low-segregation vinyl group distribution. In a preferred embodiment, the long-term stress resistance has been additionally increased by the additional use of the reinforcing filler (B) comprising covalently bound, aliphatically unsaturated groups.

In a further preferred embodiment, the polydiorganosiloxane (A) in the crosslinkable silicone rubber compositions of the invention contains a proportion of from 0.4 to 10 mol % of organosiloxy units having aliphatically unsaturated groups.

The polyorganosiloxane (A) corresponds to the general average formula (1)

where
a is from 1.9 to 2.0,
b is from 0.002 to 0.1, the radicals $R^1$ are identical or different and are each an OH group or a monovalent, optionally halogen-substituted or heteroatom-containing hydrocarbon radical which has from 1 to 20 carbon atoms and is free of aliphatically unsaturated groups and the radicals $R^2$ are identical or different and are each a monovalent, aliphatically unsaturated, optionally halogen-substituted or heteroatom-containing hydrocarbon radical which has from 1 to 10 carbon atoms and can undergo a hydrosilylation reaction.

Examples of $R^1$ are alkyl radicals such as methyl, ethyl, propyl, isopropyl, tert-butyl, n-pentyl, isopentyl, neopentyl, tert-pentyl, n-octyl, 2-ethylhexyl, 2,2,4-trimethylpentyl, n-nonyl, and octadecyl radicals; cycloalkyl radicals such as the cyclopentyl, cyclohexyl, cycloheptyl, norbornyl, adamantylethyl or bornyl radicals; aryl or alkaryl radicals such as the phenyl, ethylphenyl, tolyl, xylyl, mesityl or naphthyl radicals; aralkyl radicals such as the benzyl, 2-phenylpropyl and phenylethyl radicals, and also derivatives of the abovementioned radicals which are halogenated and/or functionalized with organic groups, e.g. the 3,3,3-trifluoropropyl, 3-iodopropyl-, 3-isocyanatopropyl, aminopropyl, methacryloxymethyl or cyanoethyl radicals. Preferred radicals $R^1$ are the methyl, phenyl and 3,3,3-trifluoropropyl radical. A particularly preferred radical $R^1$ is the methyl radical.

Examples of $R^2$ are alkenyl and/or alkynyl radicals such as the vinyl, allyl, isopropenyl, 3-butenyl, 2,4-pentadienyl, butadienyl, 5-hexenyl, undecenyl, ethynyl, propynyl and hexynyl radicals; cycloalkenyl radicals such as the cyclopentenyl, cyclohexenyl, 3-cyclohexenylethyl, 5-bicycloheptenyl, norbornenyl, 4-cyclooctenyl and cyclooctadienyl radicals; alkenylaryl radicals such as the styryl or styrylethyl radicals, and also halogenated and/or heteroatom-containing derivatives of the above radicals, e.g. the 2-bromovinyl, 3-bromo-1-propynyl, 1-chloro-2-methylallyl, 2-(chloromethyl)allyl, styryloxy, allyloxypropyl, 1-methoxyvinyl, cyclopentenyloxy, 3-cyclohexenyloxy, acryloyl, acryloyloxy, methacryloyl or methacryloyloxy radicals. Preferred radicals $R^2$ are the vinyl, allyl and 5-hexenyl radicals. A particularly preferred radical $R^2$ is the vinyl radical.

The polyorganosiloxane (A) has, in particular, a low-segregation to segregation-free distribution of the alkenyl-functional organosiloxy units, i.e. a distribution in which the alkenyl-functional organosiloxy units are arranged very uniformly along the polymer chain. Ideally, the alkenyl-functional organosiloxy groups are distributed equidistantly. A low-segregation distribution corresponds, in the ideal case, to a random distribution of the alkenyl-functional organosiloxy groups. For statistical reasons, some, relatively few, neighboring alkenyl-functional organosiloxy units occur. A quantitative measure of the quality of the distribution of the alkenyl-functional organosiloxy units along the polymer chain which can be determined by experiment is the block number R. It indicates the average number of sequences of one monomer unit in a copolymer strand consisting of 100 monomer units. For determination of the distribution of the crosslinkable alkenyl-functional organosiloxy units, sequences composed exclusively of organosiloxy units which are free of alkenyl groups are counted as only one sequence.

In the case of a random distribution of the alkenyl-functional organosiloxy units, the block number R can be calculated directly from the mole fraction $X_a$ of the alkenyl-functional organosiloxy units using the general equation (1).

$$R_{random} = 200 \cdot X_a \cdot (1-X_a) \tag{1}$$

The polyorganosiloxanes (A) used according to the invention have a content of alkenyl-functional organosiloxy units of from 0.2 to 20 mol %. According to equation (1), the block number $R_{random}$ is from 0.3992 to 32. Comparison of the block number $R_{random}$ calculated for a particular content of alkenyl-functional organosiloxy units with the experimentally determined block number $R_{exp}$ makes it possible to decide whether the distribution of the alkenyl-functional organosiloxy units is random, in which case $R_{exp}=R_{random}$, or tends to a block-like distribution, in which case $R_{exp}<R_{random}$, or when $R_{exp}>R_{random}$, tends to an alternating, i.e. equidistant, distribution. A low-segregation and thus inventive distribution of the alkenyl-functional organosiloxy units thus fulfils the relationship (1).

$$R_{exp} \geq 0.9 \cdot R_{random} \tag{1}$$

Inserting equation (1) into this relationship thus gives the relationship (2).

$$R_{exp} \geq 180 \cdot X_a \cdot (1-X_a) \tag{2}$$

The experimentally determined block length $R_{exp}$ of the polydiorganosiloxanes (A), in accordance with the relationship (2), is within the limits 0.36 and 28.8, depending on the vinyl content.

The experimental determination of the block number $R_{exp}$ is carried out, for example, by means of IR spectroscopy, preferably by means of $^{29}$Si-NMR, and is described in the literature, for example in M. J. Ziemelis; J. C. Saam, *Macromolecules* 1989, 22, 2111-2116. The relevant disclosure of this reference is incorporated by reference into the present patent application.

The preparation of low-segregation or segregation-free polyorganosiloxanes (A) is carried out by methods known from the prior art, as described, for example, in EP 0 542 471 A1 and U.S. Pat. No. 4,020,044, whose relevant disclosures are hereby incorporated by reference into the present application. Here, approximately equidistant incorporation of methylvinylsiloxy units into the polyorganosiloxane chain is made possible by reaction of an SiOH-terminated siloxane having a narrow molecular weight distribution with a methylvinyldi(N-alkylacetamido)silane. Analogously, such polyorganosiloxanes can also be prepared by heterofunctional polycondensation of SiOH-terminated siloxanes with vinylmethyldichlorosilane in the presence of amines. Furthermore, polyorganosiloxanes (A) suitable for the silicone rubber compositions of the invention can be prepared by anionic ring-opening copolymerization of cyclic siloxanes using strong bases such as potassium hydroxide or potassium siloxanolate, as long as equilibration times which are sufficiently long to ensure a random distribution of the alkenyl-functional organosiloxy units are employed. A random distribution of the alkenyl-functional organosiloxy units in the polyorganosiloxane can also be achieved by $PNCl_2$-catalyzed polycondensation of linear oligosiloxanediols under equilibrating conditions.

In the silicone rubber compositions of the invention, the constituent (A) is preferably a single polyorganosiloxane but mixtures of different polyorganosiloxanes are also preferred.

The filler (B) in the silicone rubber composition of the invention is a finely divided, inorganic solid having a specific surface area measured by the BET method of at least 30 m$^2$/g, preferably from 100 to 800 m$^2$/g, more preferably from 150 to 400 m$^2$/g. For example, silicas, carbon blacks and finely divided oxides, hydroxides, carbonates, sulfates or nitrides of metals such as silicon, aluminum, titanium, zirconium, cerium, zinc, magnesium, calcium, iron and boron are used.

Preference is given to using silica having a specific surface area measured by the BET method of at least 30 m$^2$/g as filler (B). The fillers which are preferably used in the silicone rubber composition of the invention are pyrogenic silicas, precipitated silicas, silica hydrogels which have been dehydrated with retention of structure, also referred to as aerogels, and also carbon blacks. Particular preference is given to precipitated and pyrogenic silicas.

Most preferably, the filler (B) in the crosslinkable silicone rubber compositions has been surface-treated. The surface treatment is effected by methods known from the prior art for hydrophobizing finely divided fillers. Hydrophobization can, for example, be carried out either before incorporation into the polyorganosiloxane or by the in-situ method in the presence of a polyorganosiloxane. Both methods can be carried out batchwise or continuously. Hydrophobizing agents which are preferably used are organosilicone compounds which can react with the filler surface to form covalent bonds or are permanently physisorbed on the filler surface.

Preferred hydrophobizing agents correspond to the general average formula (2) or (3) or an organopolysiloxane comprising units of the general average formula (4)

$$R^3_{4-x}SiA_x \tag{2}$$

$$(R^3_3Si)_y B \tag{3}$$

$$R^3_z SiO_{(4-z)/2} \tag{4}$$

where the radicals $R^3$ are identical or different and are each a monovalent, optionally halogen-substituted hydrocarbon radical having from 1 to 12 carbon atoms, A is halogen, —OH, —OR$^4$ or —OCOR$^4$, B is —NR$^5_{3-y}$, $R^4$ is a monovalent hydrocarbon radical having from 1 to 12 carbon atoms, $R^5$ is a hydrogen atom or is defined as for $R^3$, x is 1, 2 or 3, y is 1 or 2 and z is 1, 2 or 3.

Examples of hydrophobizing agents are alkylchlorosilanes such as methyltrichlorosilane, dimethyldichlorosilane, triethylchlorosilane, octyltrichlorosilane, octadecyltrichlorosilane, octylmethyldichlorosilane, octadecylmethyldichlorosilane, octyldimethylchlorosilane, octadecyldimethylchlorosilane and tert-butyldimethylchlorosilane; alkylalkoxysilanes such as dimethyldimethoxysilane, dimethyldiethoxysilane, trimethylmethoxysilane and trimethylethoxysilane; trimethylsilanol; cyclic diorgano(poly)siloxanes such as octamethylcyclotetrasiloxane, decamethylcyclopentasiloxane; linear diorganopolysiloxanes such as dimethylpolysiloxanes having trimethylsiloxy end groups and dimethylpolysiloxanes having silanol or alkoxy end groups; disilazanes such as hexaalkyldisilazanes, in particular hexamethyldisilazane, divinyltetramethyldisilazane, bis(trifluoropropyl)tetramethyldisilazane; cyclic dimethylsilazanes such as hexamethylcyclotrisilazane. It is also possible to use mixtures of the hydrophobizing agents mentioned above. To accelerate hydrophobization, catalytically active additives such as amines, metal hydroxides and water are also added if appropriate.

The hydrophobization can, for example, be carried out in a single step using one hydrophobizing agent or a mixture of a plurality of hydrophobizing agents, or in a plurality of steps using one or more hydrophobizing agents.

Preferred fillers (B) have, as a result of a surface treatment, a carbon content of at least 0.01% by weight and up to a maximum of 20% by weight, more preferably in the range from 0.1 to 10% by weight, most preferably from 0.5 to 5% by weight. Particular preference is given to crosslinkable silicone rubber compositions in which the filler (B) is a surface-treated silica comprising from 0.01 to 2% by weight of Si-bonded, aliphatically unsaturated groups. For example, these can be Si-bonded vinyl groups.

In the silicone rubber composition of the invention, the constituent (B) is preferably used as a single finely divided filler or also with preference as a mixture of a plurality of finely divided fillers.

Preference is given to crosslinkable silicone rubber compositions according to the invention in which the crosslinker (C) is selected from the group consisting of free-radically crosslinking compounds (C1) and addition-crosslinking compounds (C2).

Preference is here given to from 0.1 to 20% by weight of crosslinker (C) being present in the silicone rubber compositions of the invention.

Preference is given to free-radical crosslinking by means of organic peroxides. As constituent (C1) which effects free-radical crosslinking, it is possible, for the purposes of the invention, to use basically all organic peroxides which correspond to the prior art and are typically used in peroxidically crosslinking silicone rubber compositions. Examples of suitable peroxides are dialkyl peroxides such as 2,5-dimethyl-2,5-di(tert-butylperoxy)hexane, 1,1-di(tert-butylperoxy)cyclohexane, 1,1-di(tert-butylperoxy)-3,3,5-trimethylcyclohexane, α-hydroxyperoxycyclohexyl α'-hydroxycyclohexyl peroxide, 3,6-dicyclohexylidene-1,2,4,5-tetroxane, di-tert-butyl peroxide, tert-butyl tert-triptyl peroxide and tert-butyl triethylmethyl peroxide, diaralkyl peroxides such as dicumyl peroxide, alkyl aralkyl peroxides such as tert-butyl cumyl peroxide and α,α'-di(tert-butylperoxy)-m/p-diisopropylbenzene, alkyl acyl peroxides such as t-butyl perbenzoate, and diacyl peroxides such as dibenzoyl peroxide, bis(2-methylbenzoyl peroxide), bis-(4-methylbenzoyl) peroxide and bis(2,4-dichlorobenzoyl peroxide). Preference is given to using vinyl-specific peroxides whose most important representatives are dialkyl peroxides and diaralkyl peroxides. Particular preference is given to using 2,5-dimethyl-2,5-di(tert-butylperoxy)hexane and dicumyl peroxide. It is possible to use individual peroxides (C1) or mixtures of different peroxides (C1).

The content of constituent (C1) in the silicone rubber composition of the invention is preferably in the range from 0.1 to 5.0% by weight, more preferably from 0.5 to 1.5% by weight. Preference is thus given to crosslinkable silicone rubber compositions according to the invention in which the crosslinker (C1) is present in an amount of from 0.1 to 5.0% by weight and is an organic peroxide or a mixture of organic peroxides.

As addition-crosslinking constituent (C2), use is made, according to the invention, of SiH-functional crosslinkers such as silanes, siloxanes and silicone resins whose units can be represented by the general average formula (5):

$$H_m R^1_n SiO_{(4-m-n)/2} \quad (5)$$

where
$R^1$ is as defined above,
m and n are positive numbers which conform to the relationships $0.005 \leq m \leq 1$ and $0.005 \leq n \leq 2$, with the proviso that an average of at least 3 Si-bonded hydrogen atoms are present per crosslinker molecule.

The hydrogen content of hydrogen atoms bound directly to silicon atoms in (C2) is preferably in the range from 0.002 to 1.7% by weight of hydrogen, more preferably from 0.1 to 1.7% by weight of hydrogen. The crosslinker (C2) has at least 3 and not more than 600 silicon atoms per molecule, preferably from 4 to 200 silicon atoms. The structure of the crosslinker (C2) can be linear, branched, cyclic or resin- or network-like. The radicals $R^1$ present in the crosslinker (C2) are preferably selected so that they are compatible with the radicals present in the constituent (A), so that the constituents (A) and (C2) are miscible. Particularly preferred crosslinkers are poly(dimethylsiloxane-co-methylhydrogensiloxanes).

The crosslinker (C2) is preferably present in the crosslinkable silicone rubber composition in such an amount that the molar ratio of SiH groups to the alkenyl-functional units of the constituent (A) is from 0.5 to 5, preferably from 1.0 to 3.0. The crosslinker (C2) can also be a mixture of a plurality of addition-crosslinking constituents.

Silicone rubber compositions according to the invention can comprise, as further possible constituent (D), from 0 to 10 parts by weight of polyorganosiloxanes which are terminated at both ends by vinyldiorganosiloxy groups and correspond to the general average formula (6):

$$R^1_2 ViSiO-[R^1_2 SiO]_n-SiR^1_2 Vi \quad (6)$$

where
n is from 3,000 to 10,000,
Vi is a vinyl radical and
$R^1$ is as defined above.

It is also possible, if appropriate, for from 0 to 200 parts by weight of further constituents (E) to be mixed into the silicone rubber compositions of the invention. They are selected from the group consisting of nonreinforcing fillers such as talc or quartz flour, inhibitors, catalysts, plasticizers, pigments, stabilizers, flame-retardant additives, mold release agents, bonding agents, hollow microspheres and mixtures thereof.

The addition reaction between the alkenyl groups of the constituent (A) and the SiH groups of the crosslinker (C2), which is referred to as hydrosilylation, preferably occurs in the presence of a catalyst. In principle, it is possible to use all hydrosilylation catalysts which correspond to the prior art and are typically used in addition-crosslinkable silicone rubber compositions. These are preferably metals such as platinum, rhodium, palladium, ruthenium and iridium and also organic metal compounds derived therefrom. Preference is given to platinum and platinum compounds, most preferably to complexes of platinum with vinylsiloxanes such as sym-divinyltetramethyldisiloxane, also known as the Karstedt catalyst.

The amount of hydrosilylation catalyst used depends essentially on the desired crosslinking rate and economic considerations. The content of hydrosilylation catalyst, based on the metal present therein, in a total addition-crosslinkable silicone rubber composition according to the invention is preferably from 0.05 to 1000 ppm by weight, more preferably from 1 to 100 ppm by weight.

The important advantage of the silicone rubber compositions of the invention is that, in contrast to the prior art, the highest long-term stress resistances, resistances which are far superior to those of conventional silicone rubber compositions and fully meet the increased service time requirements of silicone elastomer components subject to dynamic mechanical stress, can be achieved solely by use of polyorganosiloxanes which are rich in methylvinylsiloxy units (VM) and have a uniform distribution of the VM groups.

Silicone elastomers according to the invention are obtained by crosslinking the silicone rubber compositions of the invention. They have a long-term stress resistance of at least 4 million deformation cycles. They preferably withstand more than ten million, more preferably more than 15 million, deformation cycles.

The silicone elastomers according to the invention can be produced by all methods corresponding to the prior art. In the process for producing the silicone elastomers, the silicone rubber composition is preferably crosslinked at elevated temperature and under atmospheric pressure or higher pressure. Furthermore, in the process for producing the silicone elastomers, the silicone elastomer is most preferably heat treated at elevated temperature after crosslinking.

The silicone elastomers of the invention are preferably produced by extrusion, calendering, injection molding or compression molding. In the process for producing the silicone elastomers, the silicone rubber composition is preferably crosslinked at elevated temperature. Crosslinking is preferably carried out at a temperature of from 100 to 400° C. over a period of from a few seconds to about 30 minutes. Crosslinking can be carried out under atmospheric pressure or higher pressure; under atmospheric pressure by, for example, extrusion or calendering, and under superatmospheric pressure by, for example, injection molding or compression molding. The pressure is, depending on the process method, preferably from 0.1 to 50 MPa. The silicone elastomers produced can subsequently be heat treated at elevated temperature to complete the crosslinking reaction and remove volatile constituents. The silicone elastomers can also be subjected to other after-treatment processes as described, for example, in EP 0 919 594 B1, whose relevant disclosure is hereby incorporated by reference into the present patent application.

In addition, silicone elastomers according to the invention have low values for the relative specific energy loss, which is associated with very advantageous mechanical behavior. Their preferred use is in fields in which high, long-term dynamic mechanical stresses occur. In particular, keypads produced from the silicone rubber compositions of the invention display an excellent elastic response, also referred to as crispness.

The presence of alkenyl groups bound covalently to the filler surface likewise has a positive effect on the long-term stress resistance. Such silicone rubber compositions are therefore particularly preferred.

EXAMPLES

The viscosities reported below were determined at a temperature of 25° C. and a shear rate of 1 sec$^{-1}$. The plasticity of the polymers was determined in a Brabender Plastograph at 25° C. and 60 revolutions per minute. M2 denotes a dimethylsiloxy unit, and VM denotes a methylvinylsiloxy unit.

The preparation of the polydiorganosiloxanes (A) according to the invention and not according to the invention was firstly carried out by the following methods. The properties of the polymers P1 to P10, derived from the $^1$H- or $^{29}$Si-NMR spectrum, are summarized in Table 1.

Polymer P1: In a 3 l Sigma kneader, 1300 g of a dimethylpolysiloxane which has an Si-bonded hydroxyl group in each of the terminal units and a viscosity of 140 mPa·s, 18 g of a dimethylvinylsiloxy-terminated dimethylpolysiloxane having a viscosity of 174 mPa·s 3.68 g of a low molecular weight copolymer of dimethylsiloxy and methylvinylsiloxy units which has a hydroxyl group in each of the terminal units and has a content of methylvinylsiloxy units of 24.8 mol % and a viscosity of 49 mPa·s, and 0.3 ml of a 25% strength by weight solution of phosphonitrilic chloride in ethyl acetate are mixed and condensed and equilibrated at 100° C. at a reduced pressure of 5 hPa for 10 minutes. 10 ml of sym-divinyltetramethyldisilazane are subsequently added and the mixture is kneaded at 150° C. under atmospheric pressure for 2 hours. The polymer obtained is finally freed of volatile constituents at 150° C. under a reduced pressure of less than 2 hPa while continuing to knead the polymer for 1 hour. The resulting high molecular weight copolymer of M2 and VM units having terminal dimethylvinylsiloxy units has a plasticity of 6.5 kN·m.

Polymer P2: The preparation is carried out by a method analogous to that for polymer P1, with the difference that the amount of the low molecular weight copolymer of dimethylsiloxy and methylvinylsiloxy units which has a hydroxyl group in each of the terminal units and has a content of methylvinylsiloxy units of 24.8 mol % and a viscosity of 49 mPa·s is increased from 3.68 g to 18.59 g. The resulting high molecular weight copolymer of M2 and VM units having terminal dimethylvinylsiloxy units has a plasticity of 6.2 kN·m.

Polymer P3: In a 3 l Sigma kneader, 1300 g of a dimethylpolysiloxane which has an Si-bonded hydroxyl group in each of the terminal units and a viscosity of 140 mPa·s, 18 g of a dimethylvinylsiloxy-terminated dimethylpolysiloxane having a viscosity of 174 mPa·s, 18.56 g of a low molecular weight copolymer of dimethylsiloxy and methylvinylsiloxy units which has a hydroxyl group in each of the terminal units and has a content of methylvinylsiloxy units of 24.8 mol % and a viscosity of 49 mPa·s, and 0.1 ml of a 25% strength by weight solution of phosphonitrilic chloride in ethyl acetate are mixed and condensed and equilibrated at 120° C. and a reduced pressure of 2 hPa for 1 hour. Another 0.2 ml of a 25% strength by weight solution of phosphonitrilic chloride in ethyl acetate is subsequently added and the mixture is kneaded at 120° C. under reduced pressure for a further hour. The mixture is subsequently admixed with 10 ml of sym-divinyltetramethyldisilazane and kneaded at 150° C. under atmospheric pressure for 2 hours. The polymer obtained is finally freed of volatile constituents at 150° C. under a reduced pressure of less than 2 hPa while continuing to knead the polymer for 1 hour. The resulting high molecular weight copolymer of M2 and VM units having terminal dimethylvinylsiloxy units has a plasticity of 6.3 kN·m.

Polymer P4: The preparation is carried out by a method analogous to that for polymer P1, with the difference that 62.2 g of a low molecular weight copolymer of dimethylsiloxy and methylvinylsiloxy units which has a hydroxyl group in each of the terminal units and has a content of methylvinylsiloxy units of 6.7 mol % and a viscosity of 40 mpa·s are used as VM-containing copolymer. The resulting high molecular weight copolymer of M2 and VM units having terminal dimethylvinylsiloxy units has a plasticity of 5.8 kN·m.

Polymer P5: The preparation was carried out by a method analogous to that for polymer P3, with the difference that 133 g of a low molecular weight copolymer of dimethysiloxy and methylvinylsiloxy units which has a hydroxyl group in each of the terminal units and has a content of methylvinylsiloxy units of 3.1 mol % and a viscosity of 44 mPa·s are used as VM-containing copolymer. The resulting high molecular weight copolymer of M2 and VM units having terminal dimethylvinylsiloxy units has a plasticity of 6.4 kN·m.

Polymer P6: 100 parts by weight of freshly distilled octamethylcyclotetrasiloxane, 0.54 part by weight of freshly distilled 1,3,5,7-tetramethyltetravinylcyclotetrasiloxane and 0.065 part by weight of decamethyltetrasiloxane are homogeneously mixed and heated to 130° C. in a reaction vessel. The mixture was subsequently admixed with 0.02 part by weight of potassium vinyldimethylsilanolate and stirred at a temperature of 140° C. with exclusion of moisture for 4 hours. The reaction was subsequently stopped by addition of 0.02 part by weight of acetic acid and the resulting mixture was freed of volatile constituents at a temperature of 170° C. for 1 hour. The resulting high molecular weight copolymer of M2 and VM units having terminal trimethylsiloxy units has a plasticity of 6.1 kN·m.

Polymer P7: The preparation was carried out by a method analogous to that for polymer P6, with the difference that after addition of the potassium vinyldimethylsilanolate, the mixture was stirred at a temperature of 140° C. with exclusion of moisture for 12 hours. The resulting high molecular weight copolymer of M2 and VM units having terminal trimethylsiloxy units has a plasticity of 5.9 kN·m.

Polymer P8: The preparation was carried out by a method analogous to that for polymer P6, with the difference that the amount of freshly distilled 1,3,5,7-tetramethyltetravinylcyclotetrasiloxane used was increased from 0.54 part by weight to 0.73 part by weight. The resulting high molecular weight copolymer of M2 and VM units having terminal trimethylsiloxy units has a plasticity of 6.5 kN·m.

Polymer P9: The preparation was carried out by a method analogous to that for polymer P8, with the difference that after addition of the potassium vinyldimethylsilanolate, the mixture was stirred at a temperature of 140° C. with exclusion of moisture for 12 hours. The resulting high molecular weight copolymer of M2 and VM units having terminal trimethylsiloxy units has a plasticity of 5.9 kN·m.

Polymer P10: The preparation is carried out by a method analogous to that for polymer P3, with the difference that the amount of the low molecular weight copolymer used is increased from 18.56 to 51.45 g. The resulting high molecular weight copolymer of M2 and VM units having terminal dimethylvinylsiloxy units has a plasticity of 7.6 kN·m.

TABLE 1

| Polymer | VM content ($^1$H-NMR) [mol %] | Block length $R_{rand.}$ (calculated) | Block length $R_{exp.}$ ($^{29}$Si-NMR) | $0.9 \cdot R_{rand.}$ | $R_{exp.} \geq 0.9 \cdot R_{rand}$ | according to the invention |
|---|---|---|---|---|---|---|
| P1 | 0.05 | 0.10 | not measurable | — | not measurable | no |
| P2 | 0.28 | 0.56 | 0.37 | 0.504 | no | no |
| P3 | 0.26 | 0.52 | 0.49 | 0.468 | yes | yes |
| P4 | 0.29 | 0.58 | 0.55 | 0.522 | yes | yes |
| P5 | 0.30 | 0.60 | >0.60 | 0.540 | yes | yes |
| P6 | 0.46 | 0.91 | 0.73 | 0.819 | no | no |
| P7 | 0.44 | 0.88 | >0.88 | 0.792 | yes | yes |
| P8 | 0.53 | 1.05 | 0.92 | 0.945 | no | no |
| P9 | 0.57 | 1.13 | >1.13 | 1.017 | yes | yes |
| P10 | 0.64 | 1.27 | >1.27 | 1.143 | yes | yes |

The theoretical properties calculated according to equation (1) and the experimentally determined properties of the polydiorganosiloxanes, denoted as polymer P1 to P10, are shown in Table 1. The properties indicate P3 to P5, P7 and P9 to P10 as polyorganosiloxanes (A) of the invention.

The polymers P1 to P10 were used for preparing crosslinkable silicone rubber compositions. Both peroxidically crosslinkable and addition-crosslinkable silicone rubber compositions were prepared and crosslinked to produce silicone elastomers. As filler, use was made of surface-treated, precipitated silica with and without covalently bound vinyl groups.

The examples E1, E5, E6, E8, E12, E13 and E14 according to the invention and comparative examples C1, C2, C3 and C4 were prepared as follows as peroxidically crosslinkable silicone rubber compositions comprising a filler without covalently bound vinylsiloxy groups. 160 g of a polyorganosiloxane as shown in Table 2 are placed in a Sigma kneader and mixed with 4.0 g of a linear dimethylsiloxanediol which has an OH content due to terminal silanol groups of 8% by weight. A total of 64 g of precipitated silica Hi-Sil® 928 from PPG Industries and 0.16 g of calcium stearate are subsequently mixed in a little at a time, the mixture is heated to 150° C. and kneaded for 2 hours. After cooling the mixture to room temperature, 0.6 g of 2,5-dimethyl-2,5-di(tert-butylperoxy) hexane is added per 100 g of the composition on a roll mill.

The examples E2 and E9 according to the invention and the comparative example C5 were prepared as follows as peroxidically crosslinkable silicone rubber compositions comprising a filler having covalently bound vinylsiloxy groups. The preparation is carried out in a manner analogous to the above method, with the difference that a mixture of 3 g of linear dimethylsiloxanediol having an OH content due to terminal silanol groups of 8% by weight and 1.5 g of a low molecular weight copolymer of dimethylsiloxy and methylvinylsiloxy units which has a hydroxyl group in each of the terminal units and has a content of methylvinylsiloxy units of 6.7 mol % and a viscosity of 40 mpa·s is used instead of the 4.0 g of the linear dimethylsiloxanediol.

The examples E3, E7 and E10 according to the invention were prepared as follows as addition-crosslinkable silicone rubber compositions comprising a filler without covalently bound vinylsiloxy groups. 1,290 g of a polyorganosiloxane as shown in Table 2 are placed in a Sigma kneader and three portions each comprising 9 g of water, 35 g of hexamethyldisilzane and 195 g of a pyrogenic silica having a specific surface area determined by the BET method of 300 m$^2$/g, obtainable from Wacker-Chemie GmbH under the trade name HDK® T30, are added at room temperature and the mixture is in each case homogeneously mixed for 20 minutes. After addition of the third portion, the mixture in the kneader is heated to 150° C. and homogenized and freed of volatile constituents under a reduced pressure of less than 10 hPa for 3 hours; the mixture is subsequently discharged from the kneader and cooled to room temperature. To prepare the addition-crosslinkable silicone rubber composition, 200 parts by weight of the composition prepared as described above are mixed with 0.1 g of ethynylcyclohexanol, 0.2 g of a solution of a platinum-sym-divinyltetramethylsiloxane complex in a dimethylvinylsiloxy-terminated polydimethylsiloxane having a viscosity of 1 Pa·s and a platinum content of 1.1% by weight, and a methylhydrogensiloxane-dimethylsiloxane copolymer having a content of methylhydrogensiloxy units of 32 mol % and a viscosity of 95 mPa·s. Here, the amount of methylhydrogensiloxane-dimethylsiloxane copolymer is selected as a function of the polyorganosiloxane used so that the total silicone rubber composition has a molar ratio of Si-bonded vinyl groups to methylhydrogensiloxy groups of 1:1.8.

The examples E4 and E11 according to the invention were prepared as follows as addition-crosslinkable silicone rubber compositions comprising a filler having covalently bound vinylsiloxy groups. The preparation is carried out in a manner analogous to the above method, with the difference that a mixture of 9 parts by weight of hexamethyldisilazane and 1 part by weight of divinyltetramethyldisilazane is in each case used instead of the hexamethyldisilazane.

The production of silicone elastomers from the silicone rubber compositions was carried out according to the following method. Crosslinking of the silicone rubber compositions was effected at a temperature of 165° C. in compression molds at a pressure of 5.45 MPa for 15 minutes. The 2 or 6 mm thick films produced and also keypads were subsequently heat treated at 200° C. in a convection drying oven for 4 hours.

The characterization of the dynamic mechanical behavior of the silicone elastomers produced was carried out according to the following method. The characterization of the dynamic mechanical behavior was carried out in accordance with DIN 53 535 at a temperature of 20° C. on cylindrical test specimens having a diameter of 6 mm and a height of 10 mm at a frequency of 10 Hz, a static mean deformation, referred to as uniaxial compression, of 20% and a dynamic deformation amplitude of 5% by means of a dynamic mechanical spectrometer model "Eplexor" from GABO QUALMETER Testanlagen GmbH (Ahlden). The specific energy loss $E_v$ was calculated according to the equation $E_v = \pi \cdot \epsilon_a \cdot \sigma_a \cdot \sin \delta$; the calculation of the specific stored energy $E_s$, which is the deformation energy which is stored reversibly in a unit volume of the test specimen and changes as a result of the dynamic stress, was carried out according to the equation $E_s = 2 \cdot \epsilon_m \cdot \sigma_a - (\pi/2) \cdot \epsilon_a \cdot \sigma_a \cdot \sin \delta$, where $\epsilon_a$ is the dynamic deformation amplitude, $\sigma_a$ is the dynamic stress amplitude, $\epsilon_m$ is the static mean deformation and $\delta$ is the loss angle (phase shift). The relative specific energy loss is given by $E_R = (E_v/E_s) \cdot 100\%$.

The determination of the long-term stress resistance of the silicone elastomers produced was carried out according to the following method. The determination of the long-term stress resistance was carried out using 6 mm high, 20×20 mm wide keypads which were subjected continually to in each case 6 complete deformation cycles per second, corresponding to 6 Hz, at a force amplitude of 1.962 N. The measurements were carried out at 20° C. using a "Prüfsystem A 8274" instrument from ITF Engineering GmbH/Denzingen and the control unit "DTA 9616". The long-term stress resistance corresponds to the number of deformation cycles which are necessary to bring about mechanical failure, i.e. rupture, of the keypad. The long-term stress resistance is also referred to as the service life. 5 test specimens per material were tested, with the long-term stress resistances reported in Table 2 in each case representing the median value determined from the five values.

Table 2 shows examples according to the invention (E1 to E14) and comparative examples (C1 to C5) and their properties after crosslinking under long-term dynamic mechanical stress. To aid comparison of the influence of the composition of the silicone rubbers on their properties, Table 2 also shows the polymers used, the filler with (+) and without (−) covalently bound vinyl groups which is used and the type of crosslinker, viz. (P) for peroxidically crosslinkable and (A) for addition-crosslinkable.

TABLE 2

| Example | Polymer | Covalently bound vinyl groups in filler | Crosslinker | Long-term stress resistance [·10$^6$ cycles] | Relative specific energy loss [%] |
|---|---|---|---|---|---|
| C1 | P1 | no | P | 1.1 | 11.2 |
| C2 | P2 | no | P | 1.8 | 6.3 |
| C3 | P6 | no | P | 2.6 | 6.6 |
| C4 | P8 | no | P | 3.8 | 5.9 |
| C5 | P8 | yes | P | 4.1 | 5.2 |
| E1 | P3 | no | P | 4.2 | 4.2 |
| E2 | P3 | yes | P | 5.6 | 4.0 |
| E3 | P3 | no | A | 4.7 | 5.5 |
| E4 | P3 | yes | A | 6.0 | 5.1 |
| E5 | P4 | no | P | 8.0 | 5.1 |
| E6 | P5 | no | P | 9.2 | 5.3 |
| E7 | P5 | no | A | 10.1 | 5.0 |
| E8 | P7 | no | P | 16.4 | 3.7 |
| E9 | P7 | yes | P | 18.9 | 3.4 |
| E10 | P7 | no | A | 17.5 | 3.5 |
| E11 | P7 | yes | A | 17.9 | 3.4 |
| E12 | P9 | no | P | 21.9 | 2.1 |
| E13 | P10 | yes | P | 27.3 | 2.0 |
| E14 | P10 | no | P | 32.5 | 1.6 |

The influence of various factors on the resulting mechanical properties of the silicone rubbers can readily be seen in Table 2. Comparison of C2 with E1, C3 with E8 and C5 with E12 shows a strong increase in the long-term stress resistance and a reduction in the relative specific energy loss, due solely to the low-segregation distribution of the VM units in the polymer chain of E1, E8 and E12.

Comparison of E2 with E13 and E1 with E14 shows a substantial increase in the long-term stress resistance and a reduction in the relative specific energy loss due solely to an increase in the VM content of the polyorganosiloxane (A) in the silicone rubber of E13 and E14.

Comparison of C2 with E14 and C3 with E12 shows that the combination of a high VM content combined with a low-segregation distribution in the polymer chain of E14 and E12 leads to a very substantial increase in the long-term stress resistance and a reduction in the relative specific energy loss.

Comparison of C4 with C5, E1 with E2, E3 with E4, E8 with E9, E10 with E 11 and E13 with E14 shows that covalently bound vinyl groups on the filler (B) contribute to a further, albeit small, increase in the long-term stress resistance and a reduction in the relative specific energy loss.

On the other hand, comparison of E1 with E3, E8 with E10 and E9 with E11 shows that the type of crosslinking has no influence on these mechanical properties.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A peroxidically curable crosslinkable silicone rubber composition comprising
   (A) 100 parts by weight of at least one polydiorganosiloxane comprising organosiloxy units having Si—C-bonded, aliphatically unsaturated groups, polydiorganosiloxane (A) having
      (a) a mean degree of polymerization of from 3000 to 10,000,
      (b) from 0.2 to 20 mol % of organosiloxy units comprising aliphatically unsaturated groups, and
      (c) a low-segregation distribution of the organosiloxy units comprising aliphatically unsaturated groups, with the proviso that the block number R is $\geq 180 \cdot X_a \cdot (1-X_a)$, where $X_a$ is the mole fraction of these organosiloxy units
   (B) 1-90 parts by weight of at least one reinforcing filler which is present as a finely divided, inorganic solid having a specific surface area of at least 30 m$^2$/g,
   (C) 0.1-20 pans by weight of at least one crosslinker which is an organic peroxide,
   (D) 0-10 parts by weight of a polydiorganosiloxane which is terminated by vinyldiorganosiloxy groups at both ends, whose non-terminal units are free of aliphatically unsaturated groups, and which has a mean degree of polymerization of from 3000 to 10,000,
   (E) 0-200 parts by weight of one or more further constituents selected from the group consisting of nonreinforcing fillers, talc, quartz flour, inhibitors, plasticizers, pigments, stabilizers, flame-retardant additives, bonding agents, mold release agents, hollow microspheres and mixtures thereof, wherein the organosiloxy groups comprising aliphatically unsaturated groups are randomly distributed in the polydiorganosiloxane (A).

2. The crosslinkable silicone rubber composition of claim 1, wherein the polydiorganosiloxane (A) contains a proportion of from 0.4 to 10 mol % of organosiloxy units having aliphatically unsaturated groups.

3. The crosslinkable silicone rubber composition of claim 2, wherein the filler (B) is a surface-treated silica comprising from 0.01 to 2% by weight of Si-bonded, aliphatically unsaturated groups.

4. The crosslinkable silicone rubber composition of claim 1, wherein the filler (B) has been surface-treated.

5. The crosslinkable silicone rubber composition of claim 1, wherein the filler (B) is a surface-treated silica comprising from 0.01 to 2% by weight of Si-bonded, aliphatically unsaturated groups.

6. The crosslinkable silicone rubber composition of claim 1, wherein a crosslinker (C1) is present in an amount of from 0.1 to 5.0% by weight and is an organic peroxide or a mixture of organic peroxides.

7. A silicone elastomer obtained by crosslinking the silicone rubber composition of claim 1.

8. A keyboard or keyboard cover comprising the elastomer of claim 7.

9. A process for producing a silicone elastomer of claim 1, comprising crosslinking the silicone rubber composition at elevated temperature, and at atmospheric pressure or higher pressure.

10. The process for producing silicone elastomers of claim 9, wherein the silicone elastomer is heat treated at elevated temperature after crosslinking.

11. The composition of claim 1, wherein the organo groups of the polydiorganosiloxane (A) are selected from the group consisting of methyl groups and vinyl groups.

12. The composition of claim 1, wherein the only crosslinker contained in the composition is an organic free radical initiator.

13. A peroxidically curable crosslinkable silicone rubber composition comprising
   (A) 100 parts by weight of at least one polydiorganosiloxane comprising organosiloxy units having Si—C-bonded, aliphatically unsaturated groups, polydiorganosiloxane (A) having
      (a) a mean degree of polymerization of from 3000 to 10,000,
      (b) from 0.2 to 20 mol % of organosiloxy units comprising aliphatically unsaturated groups, and
      (c) a low-segregation distribution of the organosiloxy units comprising aliphatically unsaturated groups, with the proviso that the block number R is $\geq 180 \cdot X_a \cdot (1-X_a)$, where $X_a$ is the mole fraction of these organosiloxy units
   (B) 1-90 parts by weight of at least one reinforcing filler which is present as a finely divided, inorganic solid having a specific surface area of at least 30 m$^2$/g,
   (C) 0.1-20 parts by weight of at least one crosslinker which is an organic peroxide,
   (D) 0-10 parts by weight of a polydiorganosiloxane which is terminated by vinyldiorganosiloxy groups at both ends, whose non-terminal units are free of aliphatically unsaturated groups, and which has a mean degree of polymerization of from 3000 to 10,000,
   (E) 0-200 parts by weight of one or more further constituents selected from the group consisting of nonreinforcing fillers, talc, quartz flour, inhibitors, plasticizers, pigments, stabilizers, flame-retardant additives, bonding agents, mold release agents, hollow microspheres and mixtures thereof, wherein the polydiorganosiloxane (A) is a vinyldimethylsiloxy-terminated copolymer of siloxy groups consisting of both dimethylsiloxy and methylvinyldiloxy groups.

14. The composition of claim 13, wherein polydiorganosiloxane (A) contains from 0.4 to 10 mol % of organosiloxy units comprising aliphatically unsaturated groups.

15. The composition of claim 13, wherein the organo groups of the polydiorganosiloxane (A) are selected from the group consisting of aliphatically unsaturated hydrocarbon radicals and unsubstituted $C_{1-20}$ hydrocarbon radicals free of aliphatic unsaturation.

* * * * *

UNITED STATES PATENT AND TRADEMARK OFFICE
CERTIFICATE OF CORRECTION

PATENT NO. : 7,722,957 B2 Page 1 of 1
APPLICATION NO. : 11/352747
DATED : May 25, 2010
INVENTOR(S) : Frank Achenbach et al.

It is certified that error appears in the above-identified patent and that said Letters Patent is hereby corrected as shown below:

Column 15, line 36, Claim 1:

Delete "pans" and insert -- parts --.

Signed and Sealed this

Thirty-first Day of August, 2010

David J. Kappos
*Director of the United States Patent and Trademark Office*